United States Patent
Hwang et al.

(10) Patent No.: US 10,481,425 B2
(45) Date of Patent: Nov. 19, 2019

(54) DISPLAY PANEL

(71) Applicant: Samsung Display Co., Ltd., Yongin-Si, Gyeonggi-Do (KR)

(72) Inventors: Min Ha Hwang, Seoul (KR); Seung-Suk Yang, Asan-si (KR); You Hyun Jeong, Cheonan-si (KR); Joong Tae Kim, Icheon-si (KR); Da Young Lee, Seoul (KR); Kweon Sam Hong, Asan-si (KR)

(73) Assignee: Samsung Display Co., Ltd. (KR)

( * ) Notice: Subject to any disclaimer, the term of this patent is extended or adjusted under 35 U.S.C. 154(b) by 81 days.

(21) Appl. No.: 14/957,111

(22) Filed: Dec. 2, 2015

(65) Prior Publication Data

US 2016/0320662 A1 Nov. 3, 2016

(30) Foreign Application Priority Data

Apr. 30, 2015 (KR) .................. 10-2015-0062005

(51) Int. Cl.
| | |
|---|---|
| *G02F 1/1335* | (2006.01) |
| *G02F 1/1339* | (2006.01) |
| *G02B 5/20* | (2006.01) |
| *G02F 1/1368* | (2006.01) |
| *G02F 1/1333* | (2006.01) |
| *G02F 1/1362* | (2006.01) |

(52) U.S. Cl.
CPC ....... *G02F 1/133512* (2013.01); *G02B 5/201* (2013.01); *G02F 1/1368* (2013.01); *G02F 1/13394* (2013.01); *G02F 1/133345* (2013.01); *G02F 1/133514* (2013.01); *G02F 2001/136222* (2013.01)

(58) Field of Classification Search
CPC .............. G02F 1/13394; G02F 1/1368; G02F 1/133345; G02F 1/133512
See application file for complete search history.

(56) References Cited

U.S. PATENT DOCUMENTS

| | | | | |
|---|---|---|---|---|
| 6,281,960 B1 * | 8/2001 | Kishimoto | ........ | G02F 1/133377 349/110 |
| 6,671,025 B1 * | 12/2003 | Ikeda | ................ | G02F 1/133514 349/106 |
| 7,426,009 B2 * | 9/2008 | Sawasaki | .......... | G02F 1/133707 349/106 |
| 7,443,465 B2 * | 10/2008 | Kim | .................. | G02F 1/133514 349/106 |
| 7,826,027 B2 * | 11/2010 | Sawasaki | ............ | G02F 1/13392 349/106 |

(Continued)

*Primary Examiner* — Dung T Nguyen
(74) *Attorney, Agent, or Firm* — Innovation Counsel LLP

(57) ABSTRACT

A display panel may include the following elements: a substrate; a first-color filter, which overlaps the substrate and may include a first-color portion and a first-color part; a second-color filter, which may include a second-color portion and a second-color part; a third-color filter, which may include a third-color portion and a third-color part; a light-blocking structure, which may be positioned between the first-color part and the second-color part in a plan view of the display panel and may include the first-color portion, the second-color portion, and the third-color portion, wherein the first-color portion, the second-color portion, and the third-color portion are stacked in a direction perpendicular to the substrate.

27 Claims, 15 Drawing Sheets

(56) References Cited

U.S. PATENT DOCUMENTS

| | | | |
|---|---|---|---|
| 8,310,628 B2* | 11/2012 | Sakata | B29D 11/00634 |
| | | | 349/106 |
| 2016/0033814 A1* | 2/2016 | Na | G02F 1/133305 |
| | | | 349/106 |

* cited by examiner

DISPLAY PANEL

CROSS-REFERENCE TO RELATED APPLICATION

This application claims priority to and the benefit of Korean Patent Application No. 10-2015-0062005 filed in the Korean Intellectual Property Office on Apr. 30, 2015; the entire contents of the Korean Patent Application are incorporated herein by reference.

BACKGROUND (a) Technical Field

The technical field relates to a display panel.

(b) Description of the Related Art

A display panel may be used in a display device and may include a plurality of pixels. As an example, a liquid crystal display panel may be used in a liquid crystal display device. The liquid crystal display panel includes a liquid crystal layer and field generating electrodes for generating an electric field in the liquid crystal layer.

The field generating electrodes include a pixel electrode and an opposing electrode. The pixel electrode is connected to a switching element, such as a thin film transistor (TFT), to receive a data voltage corresponding to an input image signal. The opposing electrode may receive a common voltage and may be formed over an entire surface of the display panel. Liquid crystal molecules are arranged by adjusting an intensity of the electric field generated in the liquid crystal layer by applying a voltage to the pixel electrode and the opposing electrode, to display a desired image by adjusting the quantity of light transmitted through the liquid crystal layer.

The liquid crystal display panel also includes a light blocking member capable of blocking light leakage between pixels. The light blocking member may be formed of a black material. Misalignment of the light blocking member may undesirably cause a decrease in an aperture ratio in the display panel, such that brightness of images displayed by the display device may be unsatisfactory.

The above information disclosed in this Background section is for enhancement of understanding of the background of the invention. The Background section may contain information that does not form the prior art that is already known in this country to a person of ordinary skill in the art.

SUMMARY

Embodiments may decrease the number of optical masks required in a manufacturing process of a display panel, to improve yield and reduce manufacturing cost.

Embodiments may reduce material cost for a light blocking member.

Embodiments may enable a satisfactory contrast ratio in an adjacent area of a white pixel and a color pixel.

Embodiments may enable a satisfactory aperture ratio and/or a satisfactory contrast ratio in a display panel, e.g., a curved display panel.

An embodiment may be related to a display panel. The display panel may include the following elements: a substrate; a first-color filter, which may overlap the substrate and may include a first-color portion and a first-color part; a second-color filter, which may include a second-color portion and a second-color part; a third-color portion; and a light-blocking structure, which may be positioned between the first-color part and the second-color part in a plan view of the display panel and may include the first-color portion, the second-color portion, and the third-color portion. The first-color portion, the second-color portion, and the third-color portion may be stacked (i.e., may overlap one another) in a direction perpendicular to the substrate.

The light-blocking structure may display a black color through subtractive mixing of colors of the first-color portion, the second-color portion, and the third-color portion.

A maximum thickness of the first-color portion in the direction perpendicular to the substrate may be less than a maximum thickness of the first-color part in the direction perpendicular to the substrate.

The display panel may include a third-color filter. The third-color portion may be positioned between the first-color portion and the second-color portion and may be separated from the third-color filter. The third-color portion and the third-color filter are formed of a same third-color material.

The display panel may include a transparent member formed of a colorless or white insulating material. The second-color portion may be positioned between the first-color portion and the transparent member in the direction perpendicular to the substrate.

The display panel may include a common electrode configured to receive a common voltage. The display panel may include a passivation layer positioned between the common electrode and the transparent member and directly contacting each of the electrode and the transparent member.

The display panel may include a spacer. The transparent member may be positioned between the second-color portion and the spacer in the direction perpendicular to the substrate and may be wider than the spacer in a direction parallel to the substrate.

The display panel may include a common electrode configured to receive a common voltage. The display panel may include a spacer directly contacting the common electrode, positioned between the common electrode and the substrate, spaced from the transparent member in a direction parallel to the substrate, and being narrower than the transparent member in the direction parallel to the substrate. The first-color part may be positioned between the spacer and the substrate.

A thickness of a combination of the spacer, a passivation layer, and the first-color part may be greater or less than a thickness of a combination of the transparent member and the light-blocking structure by a margin that is in a range of 0.3 micrometer to 0.5 micrometer.

A liquid crystal layer portion may be positioned between the common electrode and the transparent member or the spacer in the direction perpendicular to the substrate.

The display panel may include a common electrode overlapping the substrate and configured to receive a common voltage. The display panel may include a shielding electrode positioned between the common electrode and the transparent member.

The display panel may include a pixel electrode overlapping the first-color part. The pixel electrode and the shielding electrode may be formed of a same material and may be formed using a same material layer.

The display panel may include the following elements: a common electrode overlapping the substrate; a shielding electrode positioned between the common electrode and the second-color portion; and a pixel electrode overlapping the first-color part. The pixel electrode and the shielding electrode may be formed of a same material.

The display panel may include a spacer positioned between the common electrode and the first-color part and directly contacting at least one of the common electrode and the first-color part.

The display panel may include a signal line overlapping the substrate and may include a transistor electrically connected to the signal line. At least one of the signal line and the transistor may overlap each of the first-color portion, the second-color portion, and the third-color portion in the direction perpendicular to the substrate.

The display panel may include a common electrode configured to receive a common voltage. A portion of the common electrode may be positioned between the second-color portion and the third-color portion in the direction perpendicular to the substrate. The display panel may include a transparent member formed of a colorless or white insulating material. The third-color portion may be positioned between the transparent member and the portion of the common electrode in the direction perpendicular to the substrate.

The display panel may include a passivation layer. A portion of the passivation layer may be positioned between the second-color portion and the third-color portion in the direction perpendicular to the substrate. The display panel may include a transparent member formed of a colorless or white insulating material. The third-color portion may be positioned between the transparent member and the portion of the passivation layer in the direction perpendicular to the substrate.

An embodiment provides a display panel that may include the following elements: a first substrate and a second substrate, which face each other; a plurality of color filters and a white filter positioned between the first substrate and the second substrate; and a light blocking overlap portion including overlapping portions of three or more of the plurality of color filters. The overlapping portions are stacked in a direction perpendicular to the first substrate. The light blocking overlap portion is positioned between transmitting areas of adjacent pixels of the display panel.

The light blocking overlap portion may extend along a signal line positioned between the adjacent pixels in a plan view of the display panel.

The overlapping portions of the three or more color filters included in the light blocking overlap portion together may display black through subtractive mixing.

A thickness of a part of a first color filter positioned in a transmission area of a pixel may be larger than a thickness of a portion of the first color filter included in the light blocking overlap portion.

The white filter may be positioned on a part of the light blocking overlap portion, and the white filter and the light blocking overlap portion positioned under the white filter together may form a spacing overlap portion.

The spacing overlap portion may serve as a spacer maintaining an interval between the first substrate and the second substrate.

The display panel may further include a spacer positioned on the spacing overlap portion.

The display panel may further include a spacer spaced from the spacing overlap portion.

One of the plurality of color filters and the white filter may be positioned under the spacer.

A difference between a thickness of the spacing overlap portion in a direction perpendicular to the first substrate and a thickness of a combination of the spacer and the color filter or the white filter under the spacer may be in a range of about 0.3 micrometer to 0.5 micrometer.

One of the spacing overlap portion and the spacer may serve as a main spacer, and the other one may serve as a secondary spacer.

The display panel may further include a shielding electrode positioned on the spacing overlap portion.

The display panel may further include a plurality of pixel electrodes positioned on the color filters. The pixel electrode and the shielding electrode may be positioned in the same material layer.

The display panel may further include a shielding electrode positioned on the light blocking overlap portion.

The display panel may further include a plurality of pixel electrodes positioned on the color filters. The pixel electrode and the shielding electrode may be positioned in the same material layer.

The display panel may further include a spacer spaced apart from the light blocking overlap portion.

One of the plurality of color filters and the white filter may be positioned under the spacer.

The display panel may further include the following elements: a plurality of signal lines positioned on the first substrate; and a plurality of thin film transistors connected with the plurality of signal lines. The light blocking overlap portion may overlap at least one of the plurality of signal lines and the plurality of thin film transistors.

The display panel may include a plurality of color pixels, which include the plurality of color filters. The display panel may include a white pixel, which includes the white filter. The plurality of color pixels and the white pixel may be arranged in a substantially quadrangular matrix form.

The plurality of color pixels may display red, green, and blue.

DETAILED DESCRIPTION OF EMBODIMENTS

Figure 1:
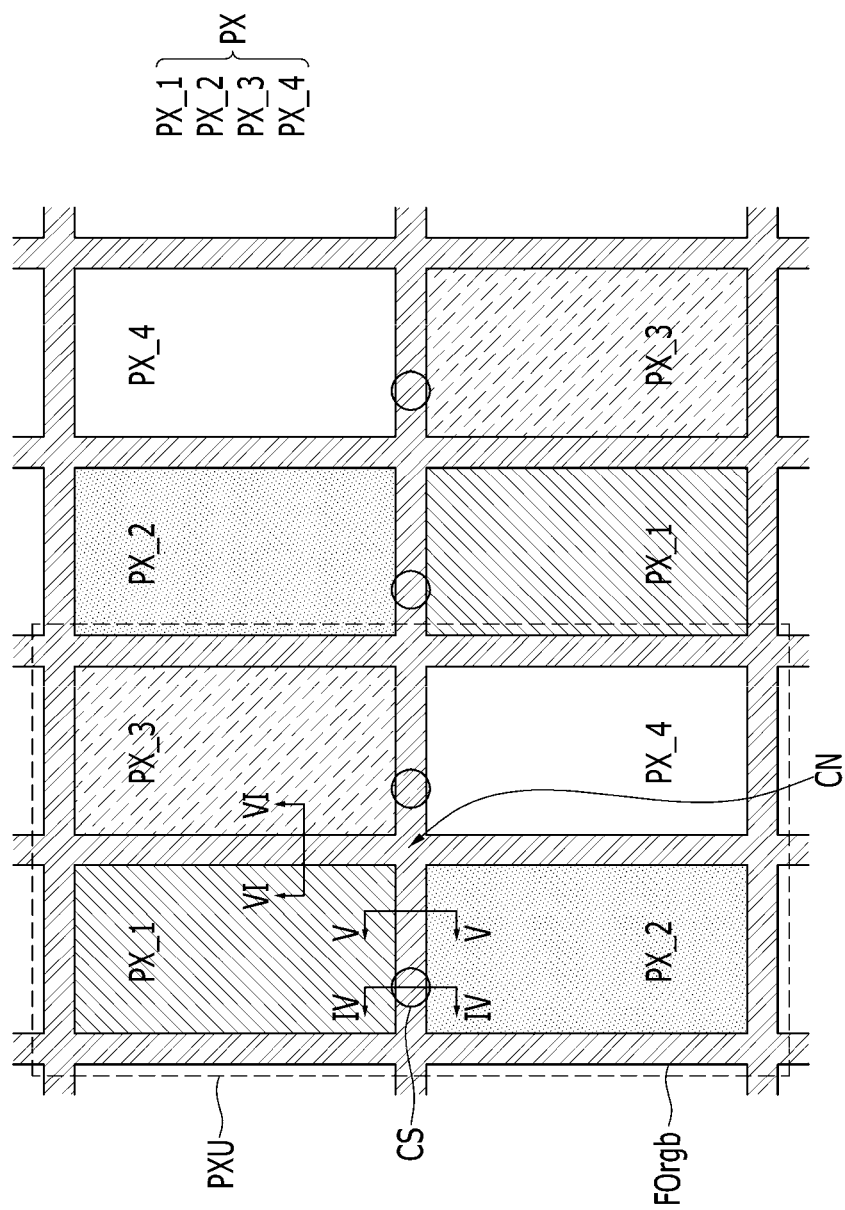
FIG. 1 is a layout view (or plan view) of a display panel according to an embodiment.

Embodiments will be described with reference to the accompanying drawings. As those skilled in the art would realize, the described embodiments may be modified in various different ways.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

In the drawings, thicknesses of layers, films, panels, regions, etc., may be exaggerated for clarity. Like reference numerals may designate like elements. It will be understood that when a first element (such as a layer, film, region, or substrate) is referred to as being "on" a second element, the first element can be directly on the second element, or one or more intervening elements may be present between the first element and the second element. When a first element is referred to as being "directly on" a second element, there are no intended intervening elements provided between the first element and the second element. Unless explicitly described to the contrary, the word "comprise" and variations, such as "comprises" or "comprising", will be understood to imply the inclusion of stated elements but not the exclusion of any other elements. The term "connect" may mean "electrically connect". The term "insulate" may mean "electrically insulate". The term "formed" may mean "formed, provided, and/or positioned".

Figure 2:
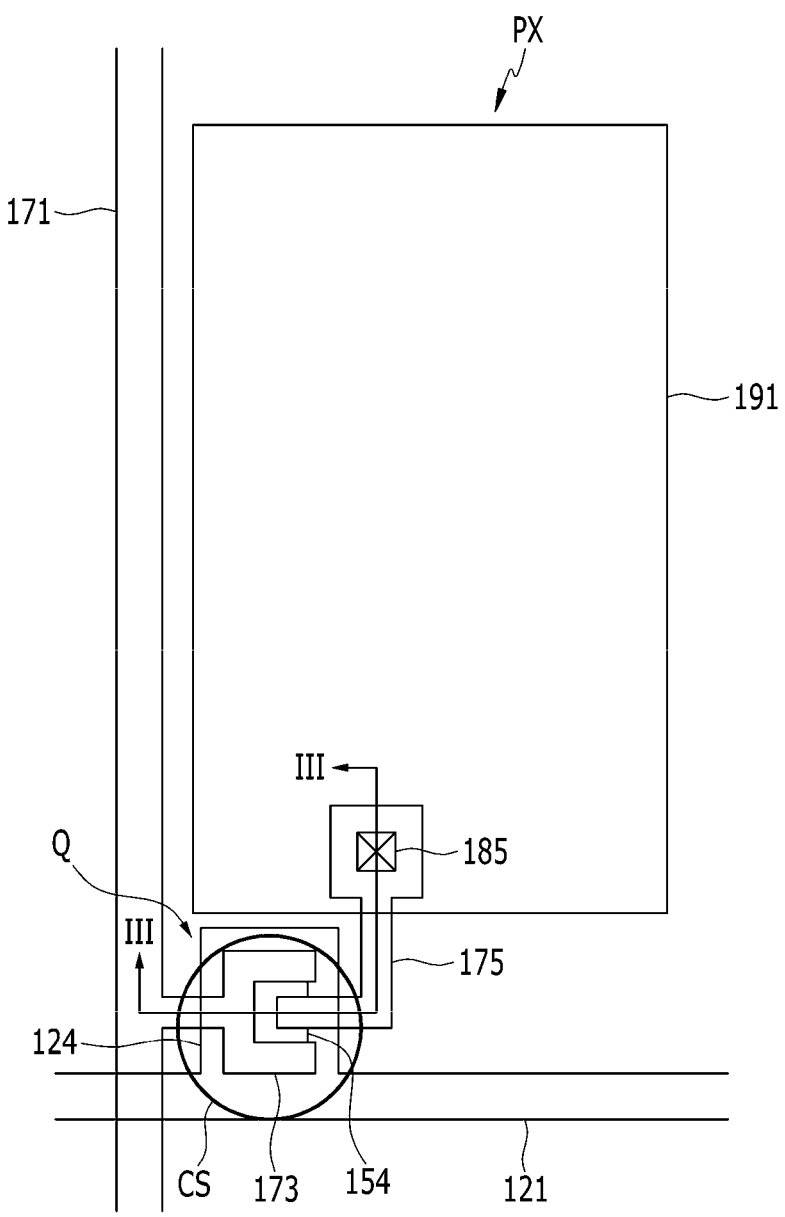
FIG. 2 is a layout view (or plan view) of one pixel of the display panel according to an embodiment.
Figure 3:
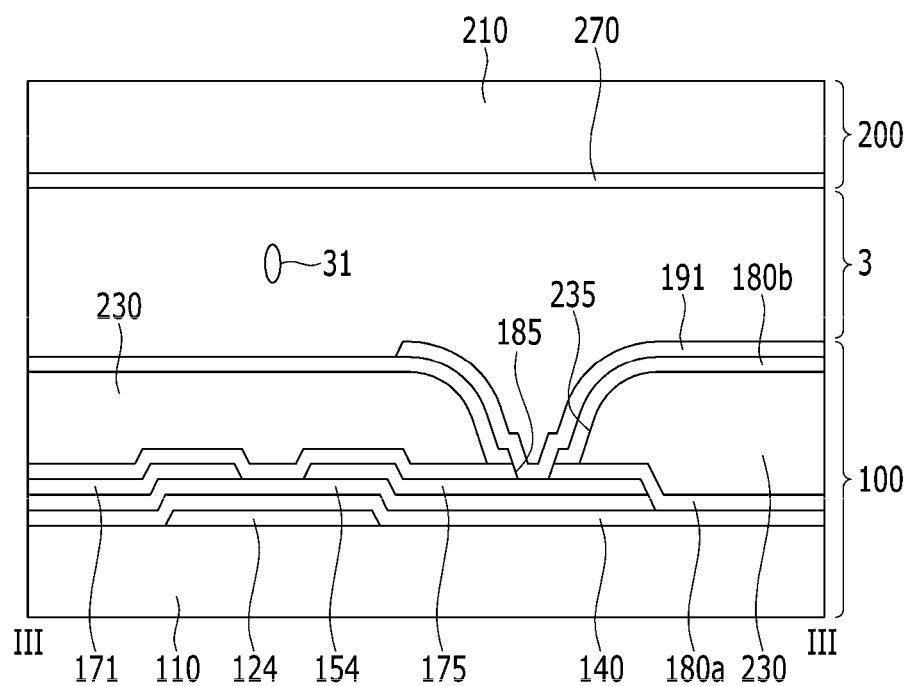
FIG. 3 is a cross-sectional view of the display panel taken along line III-III illustrated in FIG. 2 according to an embodiment.
Figure 4:
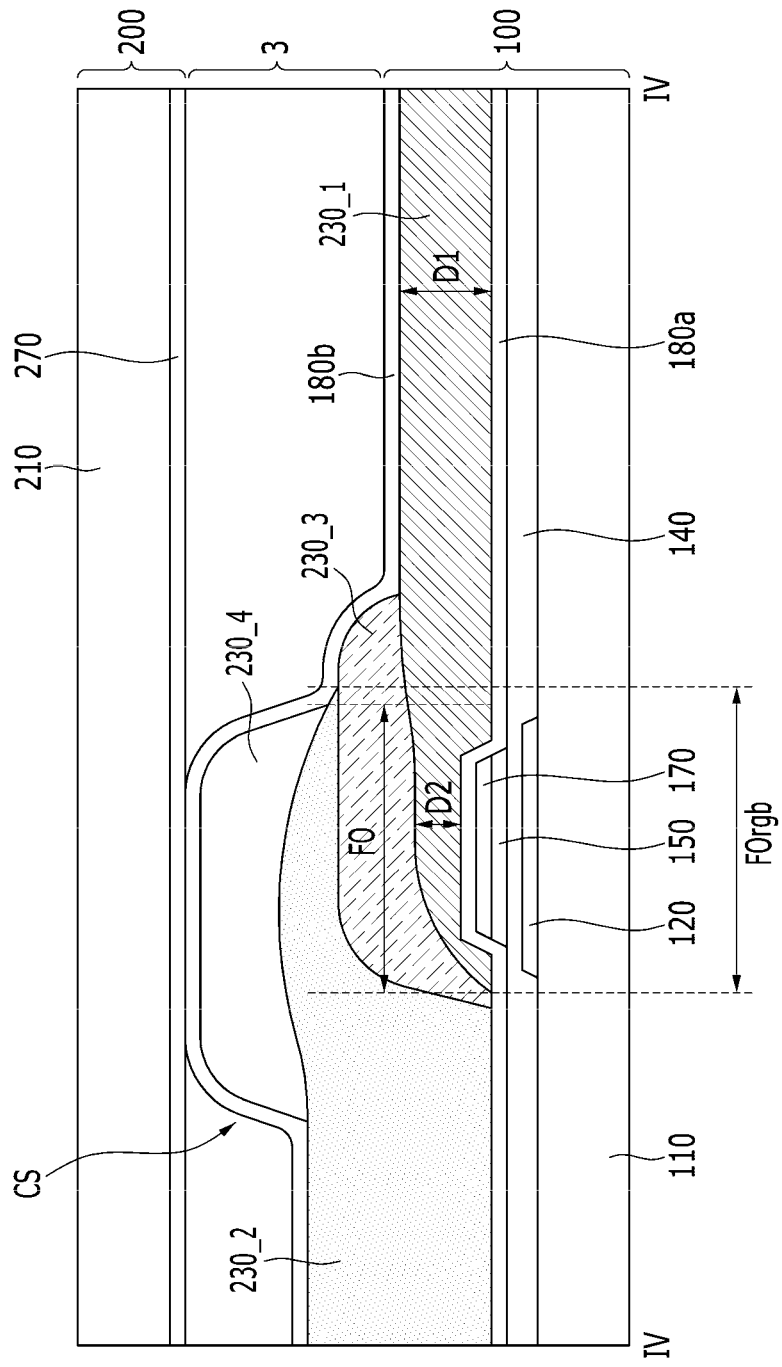
FIG. 4 is a cross-sectional view of the display panel taken along line IV-IV illustrated in FIG. 1 according to an embodiment.
Figure 5:
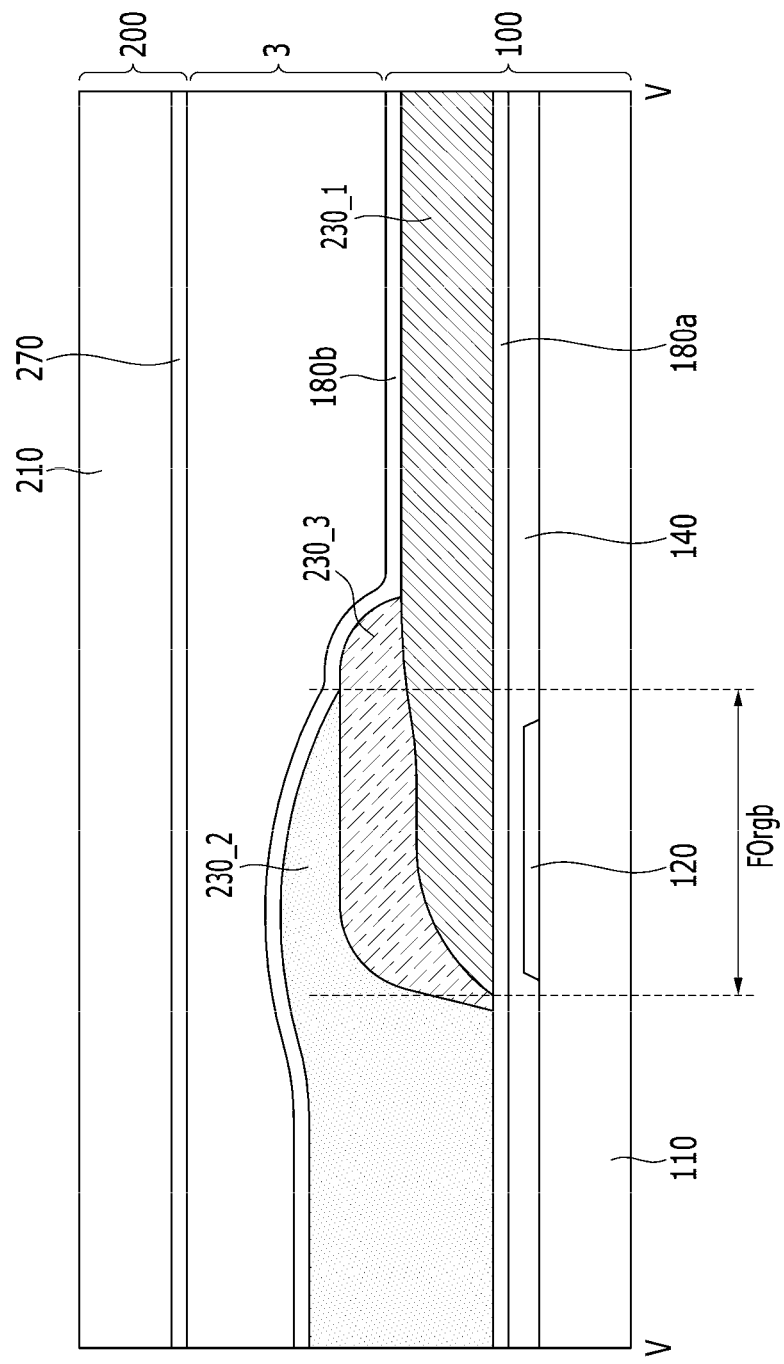
FIG. 5 is a cross-sectional view of the display panel taken along line V-V illustrated in FIG. 1 according to an embodiment.
Figure 6:
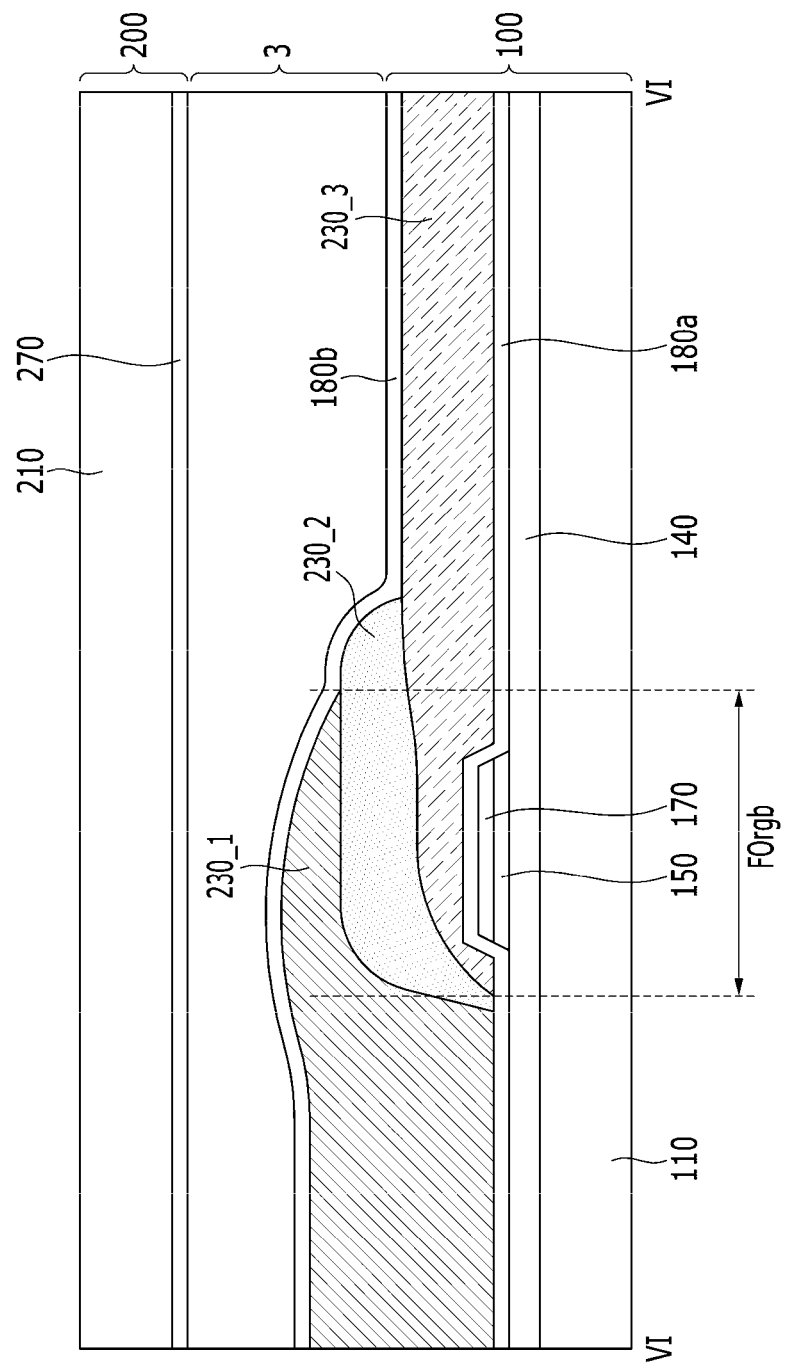
FIG. 6 is a cross-sectional view of the display panel taken along line VI-VI illustrated in FIG. 1 according to an embodiment.

FIG. 1 is a layout view (or plan view) of a display panel according to an embodiment, FIG. 2 is a layout view (or plan view) of one pixel of the display panel according to the embodiment, FIG. 3 is a cross-sectional view of the display panel taken along line III-III illustrated in FIG. 2, FIG. 4 is a cross-sectional view of the display panel taken along line IV-IV illustrated in FIG. 1, FIG. 5 is a cross-sectional view of the display panel taken along line V-V illustrated in FIG. 1, and FIG. 6 is a cross-sectional view of the display panel taken along line VI-VI illustrated in FIG. 1.

Referring to FIGS. 1 to 6, the display panel includes a display area for displaying an image, and the display area corresponds to a plurality of pixels PX.

A pixel PX may mean a unit area for displaying a portion of an image corresponding to one input image signal. A pixel PX may include a transmitting area (also called "an opening area") through which light actually passes or is emitted and may include a light blocking area in which light is blocked. A corresponding switching device, such as a thin film transistor, and/or a light blocking member may be positioned in the light blocking area.

The plurality of pixels PX may be arranged in a matrix form (or array).

The plurality of pixels includes a plurality of color pixels PX_1, PX_2, and PX_3 displaying primary colors, such as red, green, and blue, and a white pixel PX_4. The color pixels PX_1, PX_2, and PX_3 include a first color pixel PX_1 (or first-color pixel PX_1), a second color pixel PX_2 (or second-color pixel PX_2), and a third color pixel PX_3 (or third-color pixel PX_3). For example, the first color pixel PX_1 may display red, the second color pixel PX_2 may display green, and the third color pixel PX_3 may display blue.

The color pixels PX_1, PX_2, and PX_3 displaying different colors may form one pixel unit PXU to display an image of various colors including grey, white, and black. The white pixel PX_4 adjacent to the three color pixels PX_1, PX_2, and PX_3 does not display a color and is transparent, thereby improving luminance of an image when the white pixel PX_4 is driven together with the color pixels PX_1, PX_2, and PX_3. Accordingly, it is possible to decrease power consumption of the display panel including the white pixel PX_4. The white pixel PX_4 may be included in the pixel unit PXU formed of the three adjacent color pixels PX_1, PX_2, and PX_3.

In an embodiment, only the three kinds of color pixels PX_1, PX_2, and PX_3 are illustrated, but the number of color pixels PX_1, PX_2, and PX_3 displaying different colors is not limited thereto. Further, it is illustrated that one pixel unit PXU includes only one white pixel PX_4, but the number of white pixels PX_4 included in one pixel unit PXU is not limited thereto, and may be two or more, or 0.

The plurality of color pixels PX_1, PX_2, and PX_3 and the white pixel PX_4 included in one pixel unit PXU may be arranged in a quadrangular matrix form as illustrated in FIG. 1. The positions of the pixels PX in the adjacent pixel units PXU may be the same as or different from each other.

The display panel includes a thin film transistor panel 100 and an opposing panel 200, which face each other, and includes a liquid crystal layer 3 positioned between the two panels 100 and 200.

Referring to FIGS. 2 to 6, the thin film transistor panel 100 may include a substrate 110, which may be formed of at least one of glass, plastic, etc. A gate conductor 120 may be positioned on the substrate 110. The gate conductor 120 may include a gate line 121 for transmitting a gate signal and may include a gate electrode 124 connected to the gate line 121. The gate line 121 and the gate electrode 124 include parts positioned in the display area of the display panel.

A gate insulating layer 140 is positioned on the gate conductor 120. The gate insulating layer 140 may include an inorganic insulating material, such as silicon nitride and/or silicon oxide.

A semiconductor 150 and a data conductor 170 are positioned on the gate insulating layer 140.

The semiconductor 150 is positioned in the pixel PX and includes a channel part 154 overlapping the gate electrode 124.

The data conductor 170 includes a data line 171 for transmitting a data voltage, a source electrode 173 connected with the data line 171, and a drain electrode 175 facing the source electrode 173. The data line 171, the source electrode 173, and the drain electrode 175 may include parts positioned in the display area.

The data line 171 may be generally extended between the adjacent pixels PX, but is not limited thereto.

The source electrode 173 and the drain electrode 175 face each other with the channel part 154 of the semiconductor 150 being positioned between the electrodes 173 and 175 in a plan view of the display panel.

A part of the semiconductor 150, except for the channel part 154, may substantially have the same plane shape as that of the data conductor 170 positioned on the semiconductor 150, but is not limited thereto.

The gate electrode 124 positioned in one pixel PX, the channel part 154 of the semiconductor 150, the source electrode 173, and the drain electrode 175 may form a thin film transistor Q. The thin film transistor Q serves as a switching device which receives a gate signal from the gate line 121 and is switched on/off to transmit or block the data signal from the data line 171. A structure of the thin film transistor Q is not limited to the illustration.

A first passivation layer 180a is positioned on the data conductor 170. The passivation layer 180a may include an inorganic insulating material or an organic insulating material.

A plurality of color filters 230 is positioned on the first passivation layer 180a. The color filters 230 include color filters 230_1, 230_2, and 230_3 displaying primary colors, e.g., red, green, and blue, and include a white filter 230_4 (or transparent member 230_4) displaying a white color or no color.

The color filters 230_1, 230_2, and 230_3 displaying corresponding colors are positioned in the color pixels PX_1, PX_2, and PX_3, and the white filter 230_4 is positioned in the white pixel PX_4.

Each of the color filters 230_1, 230_2, and 230_3 may allow light of a color of a specific wavelength, not white to pass through. The color filters 230_1, 230_2, and 230_3 may include, for example, a red filter, a green filter, and a blue filter displaying the three primary colors red, green, and blue. In an embodiment, the color filters 230_1, 230_2, and 230_3 may display other primary colors, for example, magenta, cyan, and yellow.

The white color filter 230_4 may also be called a transparent filter. A term, "filter" is used for the white filter 230_4 for convenience of the description, but the white filter 230_4 means a filter by which a wavelength of light passing through the white filter 230_4 may not be substantially changed and a color of passing light may substantially be maintained. That is, when white light is incident into the white filter 230_4, the white light may be directly emitted, and when green light is incident into the white filter 230_4, the green light may be directly emitted. However, a wavelength of passing light may be changed within a predetermined range according to a characteristic of the white filter 230_4. For example, when green light passes through the white filter 230_4, color coordinates of the green light may be changed within a predetermined range.

Referring to FIG. 3, the color filter 230 may include an opening 235 positioned on the drain electrode 175.

Referring to FIGS. 1, and 4 to 6, overlapping portions of at least three color filters 230_1, 230_2, and 230_3 are stacked (and overlap one another) between an area between the transmitting areas of adjacent pixels PX to form a light blocking overlap portion FOrgb (or light-blocking structure FOrgb). The overlapping portions of the color filters 230_1, 230_2, and 230_3 included in the light blocking overlap portion FOrgb may display black together through subtractive mixing. Transmittance of the light blocking overlap portion FOrgb may be, for example, about 20% or less.

For example, the first color filter 230_1 partially included in the light blocking overlap portion FOrgb may be a red filter, the second color filter 230_2 partially included in the light blocking overlap portion FOrgb may be a green filter, and the third color filter 230_3 partially included in the light blocking overlap portion FOrgb may be a blue filter. In an embodiment, the first color filter 230_1 partially included in the light blocking overlap portion FOrgb may be a cyan filter, the second color filter 230_2 partially included in the light blocking overlap portion FOrgb may be a magenta filter, and the third color filter 230_3 partially included in the light blocking overlap portion FOrgb may be a yellow filter.

The color filters 230_1, 230_2, and 230_3 and the white color 230_4 may include a photosensitive organic material, and the color filters 230_1, 230_2, and 230_3 may further include pigments having respective colors.

The light blocking overlap portion FOrgb serves as a light blocking member preventing light leakage between the transmitting areas of the pixels PX. Accordingly, the light blocking overlap portion FOrgb may surround a transmission area of each pixel PX to define the transmission area. The light blocking overlap portion FOrgb may extend along the space between the transmitting areas of adjacent pixels PX in a plan view of the display panel and may form a lattice. That is, the light blocking overlap portion FOrgb may include a portion extended in a vertical direction and a portion extended in a horizontal direction in FIG. 1, and may also include a portion positioned at a corner CN (or junction CN) of multiple pixels PX.

The light blocking overlap portion FOrgb may be connected with two color filters positioned in the transmission areas of the two adjacent pixels PX to include the two continuously formed color filters, and include one or more island-type color filters positioned in the transmission area of the non-adjacent pixel PX. For example, referring to FIGS. 1 and 4, the light blocking overlap portion FOrgb positioned between the transmitting areas of adjacent first color pixel PX_1 and second color pixel PX_2 may include a first-color portion of the first color filter 230_1 (which is connected to a first-color part of the first color filter 230_1 positioned in the transmission area of the first color pixel PX_1), a second-color portion of the second color filter 230_2 (which is connected to a second-color part of the second color filter 230_2 positioned in the transmission area of the second color pixel PX_2), and the island-type third-color portion (which is formed of the same material layer as and isolated from the third color filter 230_3 positioned in the transmission area of the third color pixel PX_3).

Referring to FIGS. 4 to 6, a thickness D1 of a part of the color filter positioned in the transmission area of the pixel PX may be larger than a thickness D2 of a portion of the same color filter positioned on the light blocking overlap portion FOrgb. For example, the thickness D1 of the first-color part of the first color filter 230_1 positioned in a transmission area TA of the first color pixel PX_1 may be larger than the thickness D2 of the first-color portion of the first color filter 230_1 positioned in the light blocking overlap portion FOrgb. In an embodiment, the thicknesses of the overlapping portions of the color filters 230_1, 230_2, and 230_3 positioned in the light blocking overlap portion FOrgb may be appropriately controlled in accordance with a light blocking ratio or a required height of the light blocking overlap portion FOrgb.

As described above, a thickness of the color filter 230, which is different according to a position, may be controlled to be thin by using a halftone optical mask including a slit, a semi-transparent area, and the like during an exposure process.

The light blocking overlap portion FOrgb may overlap at least one of the thin film transistor Q, the gate conductor 120 including the gate line 121, and the data conductor 170 including the data line 171.

Referring to FIG. 1, in the display panel, the three color pixels PX_1, PX_2, and PX_3 and one white pixel PX_4 may be gathered and disposed based on one corner CN (or junction CN). The white filter 230_4 may also be positioned at the corner CN part, and in this case, light leakage by the white filter 230_4 may also be generated at the corner CN part. The light blocking overlap portion FOrgb positioned at the corner CN part may prevent light leakage at the corner CN part potentially caused by the white pixel PX_4, thereby preventing undesirable decrease of a contrast ratio.

According to an embodiment, the light blocking overlap portion FOrgb, which is capable of preventing light leakage between the adjacent pixels PX, is positioned on the thin film transistor panel 100, on which the thin film transistor Q and the plurality of signal lines are positioned, so that even though the display panel is bent for manufacturing a curved display device, the transmission area of the pixel PX is not hidden by the light blocking area. Accordingly, the aperture ratio in the transmission area is not substantially decreased, and it is possible to prevent a contrast ratio from substantial decrease.

Referring to FIGS. 1 and 4, a part of the light blocking overlap portion FOrgb may overlap the white filter 230_4 to form a spacing overlap portion FO (or spacing structure FO). The white filter 230_4 in the spacing overlap portion FO may be positioned on the light blocking overlap portion FOrgb as illustrated in FIG. 4. In an embodiment, the white filter 230_4 in the spacing overlap portion FO may be positioned under the light blocking overlap portion FOrgb and/or inserted between adjacent two of the overlapping portions of color filters 230_1, 230_2, and 230_3 included in the light blocking overlap portion FOrgb.

An area of the spacing overlap portion FO may be included within the light blocking overlap portion FOrgb, but is not limited thereto.

The spacing overlap portion FO has a higher upper surface than surrounding color filters to protrude in an up direction, so that the spacing overlap portion FO may maintain an interval or distance between the thin film transistor panel 100 and the opposed panel 200. That is, the spacing overlap portion FO may serve as the spacer CS. In this case, a height of the upper surface of the spacing overlap portion FO may be larger than that of an upper surface of the light blocking overlap portion FOrgb of the surronding area.

An upper surface of the spacing overlap portion FO may be in contact with an inner surface of the opposing panel 200 or may be spaced apart from the inner surface of the opposing panel 200 by a predetermined distance. The upper surface of the spacing overlap portion FO may directly contact the inner surface of the opposing panel 200, and the spacing overlap portion FO may serve as a main spacer. The upper surface of the spacing overlap portion FO may be spaced from the inner surface of the opposing panel 200, and the spacing overlap portion FO may serve as a secondary spacer to maintain an interval between the thin film transistor panel 100 and the opposing panel 200 in response to an external pressure.

A main spacer is a spacer serving to maintain an interval between the opposing panel 200 and the thin film transistor panel 100 and support the opposing panel 200 and the thin film transistor panel 100 in a general state. If the number of main spacers is large, it is difficult to adjust an interval between the opposing panel 200 and the thin film transistor panel 100 in accordance with a change in a volume of the liquid crystal layer 3 according to a change in an environment, such as a temperature, so that bubbles may be generated in the liquid crystal layer 3. Thus, the number of main spacers should be limited. A secondary spacer may serve to maintain an interval between the opposing panel 200 and the thin film transistor panel 100 to assist the main spacer when an external pressure is applied to the display panel of the display device. If the number of secondary spacers is small, the main spacer is permanently deformed, and a display defect, such as stain, is generated. Therefore, a sufficient number of secondary spacers should be desirable.

The spacer CS formed by the spacing overlap portion FO may overlap the thin film transistor Q and/or the signal lines, such as the gate line 121 and the data line 171.

A width of the spacing overlap portion FO may be equal to or smaller than about 30 micrometers.

A second passivation layer 180b may be positioned on the color filter 230. The second passivation layer 180b may include an organic insulating material or an inorganic insulating material, such as SiOC.

The first passivation layer 180a and the second passivation layer 180b include a contact hole 185 exposing the drain electrode 175. The contact hole 185 may be positioned within the opening 235 of the color filter 230.

A plurality of pixel electrodes 191 is formed on the second passivation layer 180b. The pixel electrode 191 may be connected with the drain electrode 175 of the thin film transistor Q through the contact hole 185 to receive a data voltage.

The opposing panel 200 includes a substrate 210, and an opposing electrode 270 (or common electrode 270) may be positioned on the substrate 210 and may be configured to receive a common voltage. A position of the opposing electrode 270 is not limited, and may also be positioned on the thin film transistor panel 100.

The pixel electrode 191 and the opposing electrode 270 may include a transparent conductive material, such as ITO and/or IZO.

The liquid crystal layer 3 includes liquid crystal molecules 31. The liquid crystal layer 3 may have positive dielectric anisotropy or negative dielectric anisotropy. The liquid crystal molecules 31 may be aligned, so that long axes thereof are almost horizontal or vertical to the surface of the thin film transistor panel 100 or the opposing panel 200 in a state where there is no electric field. To this end, an alignment layer may be formed on an inner surface of the thin film transistor panel 100 and/or the opposing panel 200. The alignment layer may be formed by a method of applying an alignment agent on the inner surface of the panel and then performing physical processing, such as rubbing, optical processing, such as irradiating light, or chemical processing. Further, the alignment layer or the liquid crystal layer 3 may include an alignment assistant means, such as a polymer, for aligning liquid crystal molecules or assigning a pretilt. The alignment assistant means may be formed by an optical or chemical method.

The pixel electrode 191 and the opposing electrode 270 may together generate an electric field in the liquid crystal layer 3. When a voltage is applied to the pixel electrode 191 and the opposing electrode 270, an electric field is generated in the liquid crystal layer 3, and the liquid crystal molecules 31 are re-arranged. A degree of the re-alignment of the liquid crystal molecules 31 may be adjusted by adjusting an intensity of the electric field generated in the liquid crystal layer 3, and thus, it is possible to adjust a degree of a change in polarization of light passing through the liquid crystal layer 3. Then, it is possible to adjust transmittance of light passing through the liquid crystal layer 3 through a polarizer, and the like, thereby displaying an image.

Referring to FIGS. 1 to 6, in summary, the display panel may include the following elements: a substrate 110; a first-color filter 230_1, which may overlap the substrate 110 and may include a first-color portion (e.g., left portion of the filter 230_1 included in the structure FOrgb illustrated in FIG. 4) and a first-color part (e.g., right portion of the filter 230_1 illustrated in FIG. 4); a second-color filter 230_2, which may include a second-color portion (e.g., right portion of the filter 230_2 included in the structure FOrgb illustrated in FIG. 4) and a second-color part (e.g., left portion of the filter 230_1 illustrated in FIG. 4); a third-color portion (e.g., left portion of the element 230_3 included in the structure FOrgb illustrated in FIG. 4); and a light-blocking structure FOrgb, which may be positioned between the first-color part and the second-color part in a plan view of the display panel and may include the first-color portion, the second-color portion, and the third-color portion. The first-color portion, the second-color portion, and the third-color portion may be stacked (i.e., may overlap one another) in a direction perpendicular to the substrate 110. The light-blocking structure FOrgb may display a black color through subtractive mixing of colors of the first-color portion, the second-color portion, and the third-color portion.

Referring to FIG. 4, at least one of the gate conductor 120 (or the gate line 121), the semiconductor 150 (or part of the thin film transistor Q), the data conductor 170 may overlap each of the first-color portion of the first-color filter 230_1, the second-color portion of the second-color filter 230_2, and the third-color portion of the third-color element 230_3 in the direction perpendicular to the substrate 110.

Referring to FIG. 4, a maximum thickness of the first-color portion in the direction perpendicular to the substrate 110 may be less than a maximum thickness of the first-color part in the direction perpendicular to the substrate 110. A thickness D2 of the first-color portion in the direction perpendicular to the substrate 110 may be less than a thickness D1 of the first-color part in the direction perpendicular to the substrate 110.

The display panel may include a third-color filter 230_3 (illustrated in FIG. 6). The third-color portion (illustrated in FIG. 4 or FIG. 5) may be positioned between the first-color portion and the second-color portion and may be separated from the third-color filter 230_3. The third-color portion and the third-color filter 230_3 are formed of a same third-color material and may be separate parts of a same third-color filter material layer; therefore, the same reference numeral 230_3 is used for the third-color filter 230_3 illustrated in FIG. 6 and the third-color element 230_3 illustrated in FIGS. 4 and 5.

Referring to FIG. 4, the display panel may include a transparent member 230_4 formed of a colorless or white insulating material. The second-color portion may be positioned between the first-color portion and the transparent member 230_4 in the direction perpendicular to the substrate 110. The display panel may include a common electrode 270 configured to receive a common voltage. The display panel may include a passivation layer 180b positioned between the common electrode 270 and the transparent member 230_4 and directly contacting each of the electrode and the transparent member 230_4.

According to embodiments, a separate spacer for maintaining an interval between the thin film transistor panel 100 and the opposing panel 200 is not required, so that it is possible to decrease the number of optical masks during the manufacturing process. Accordingly, it is possible to decrease a time and manufacturing cost of the manufacturing process of the display panel, simplify the process, and improve a yield of a product.

According to embodiments, the light blocking overlap portion FOrgb serves to prevent light leakage, so that it is not necessary to form a separate light blocking member using a black material. Advantageously, the manufacturing process associated with the display panel may be simplified, and the manufacturing cost of the display panel may be minimized.

Figure 7:
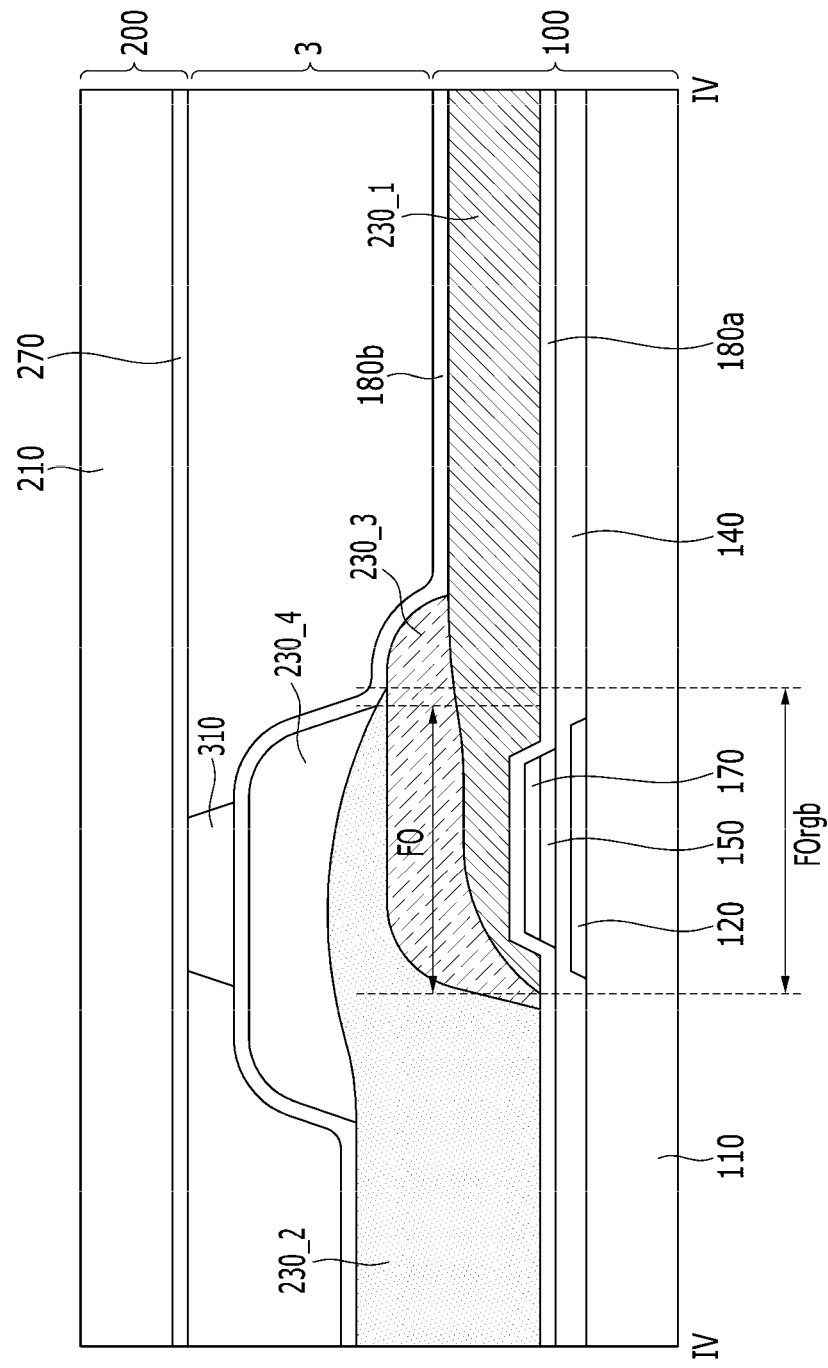
FIG. 7 is a cross-sectional view of the display panel taken along line IV-IV illustrated in FIG. 1 according to an embodiment.
Figure 8:
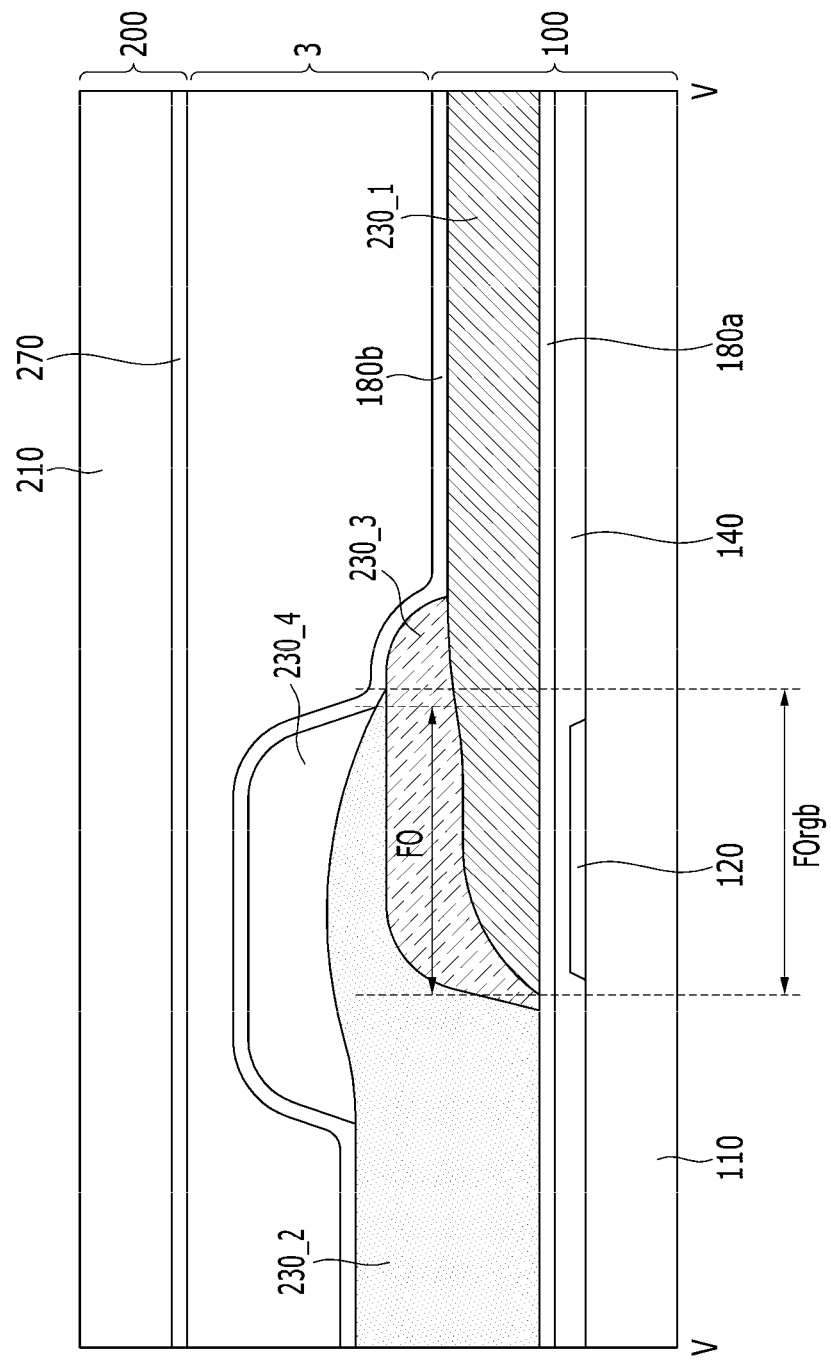
FIG. 8 is a cross-sectional view of the display panel taken along line V-V illustrated in FIG. 1 according to an embodiment.

FIG. 7 is a cross-sectional view of the display panel taken along line IV-IV illustrated in FIG. 1 according to an embodiment, and FIG. 8 is a cross-sectional view of the display panel taken along line V-V illustrated in FIG. 1 according to an embodiment.

Referring to FIGS. 1, 7, and 8, the display panels may have features analogous to or identical to features described with reference to one or more of FIGS. 1 to 6, but an additional spacer 310 may be positioned on a spacing overlap portion FO. The spacer 310 may be formed in a different process from that of a color filter 230, and may be transparent or display a color, such as black. In this case, an upper surface of the spacer 310 may be in contact with or spaced apart from an inner surface of the opposing panel 200. The transparent member 230_4 (or white filter 230_4) may be positioned between the second-color portion and the spacer 310 in the direction perpendicular to the substrate 110 and may be wider than the spacer 310 in a direction parallel to the substrate 110.

Referring to FIG. 7, the spacing overlap portion FO and the spacer 310 together may serve as a main spacer CS maintaining an interval or distance between the thin film transistor panel 100 and the opposing panel 200.

Referring to FIG. 8, the spacing overlap portion FO, in which the spacer 310 is not formed, forms a secondary spacer capable of maintaining an interval between the opposing panel 200 and the thin film transistor panel 100 when pressure is applied to the display panel.

Figure 9:
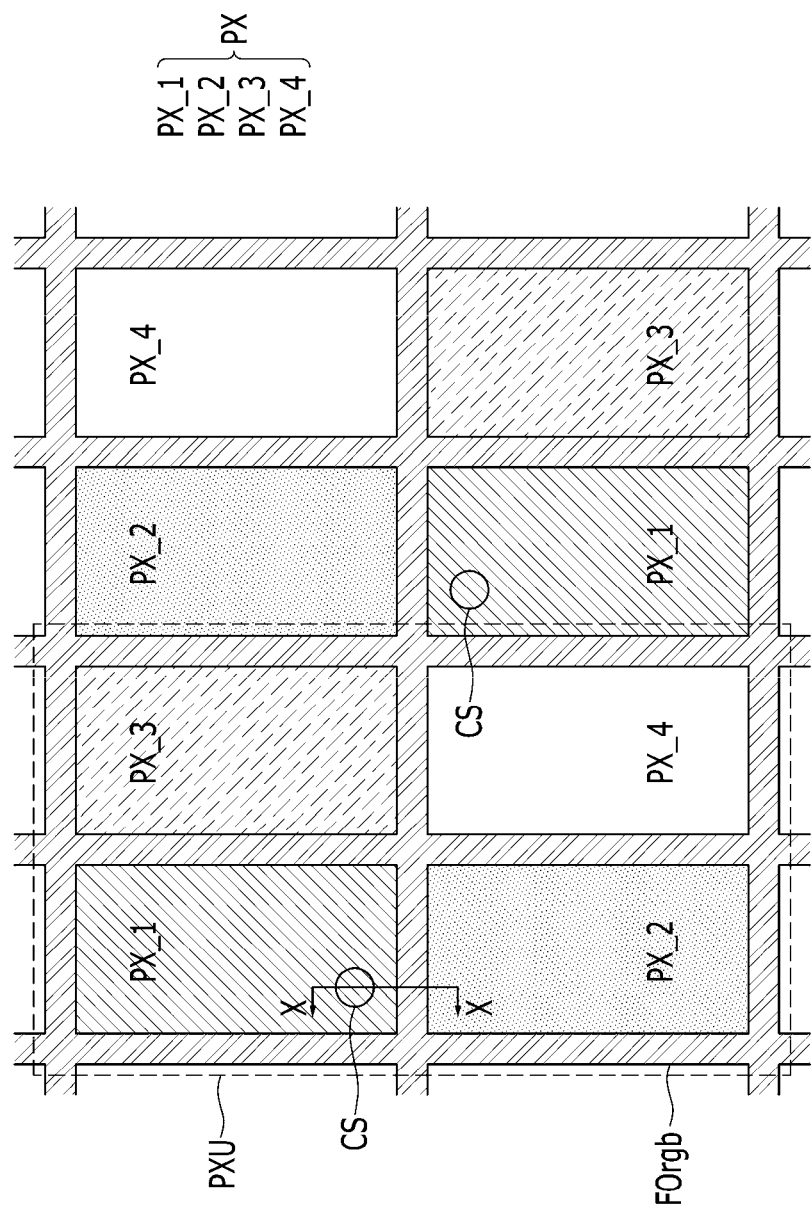
FIG. 9 is a layout view (or plan view) of a display panel according to an embodiment.
Figure 10:
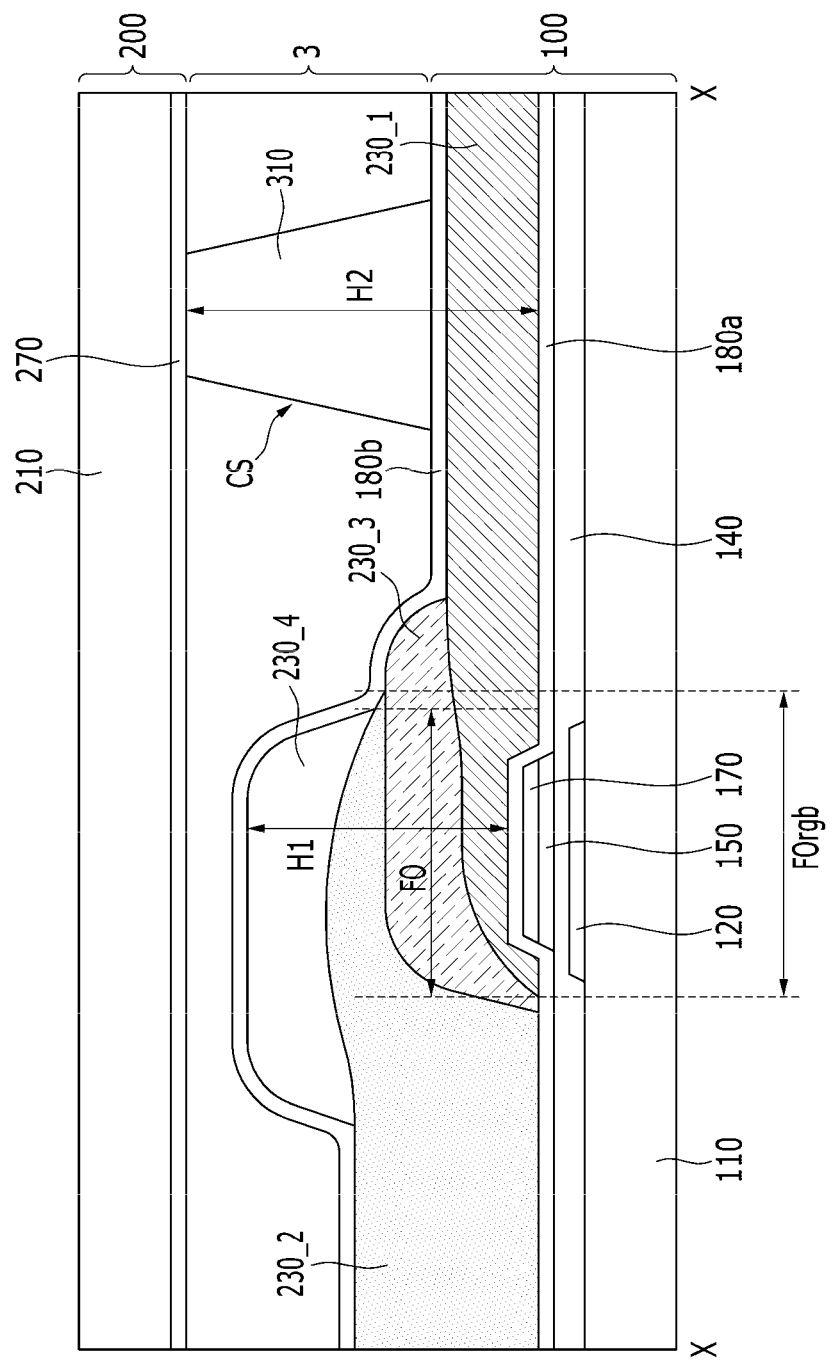
FIG. 10 is a cross-sectional view of the display panel taken along line X-X illustrated in FIG. 9 according to an embodiment.
Figure 11:
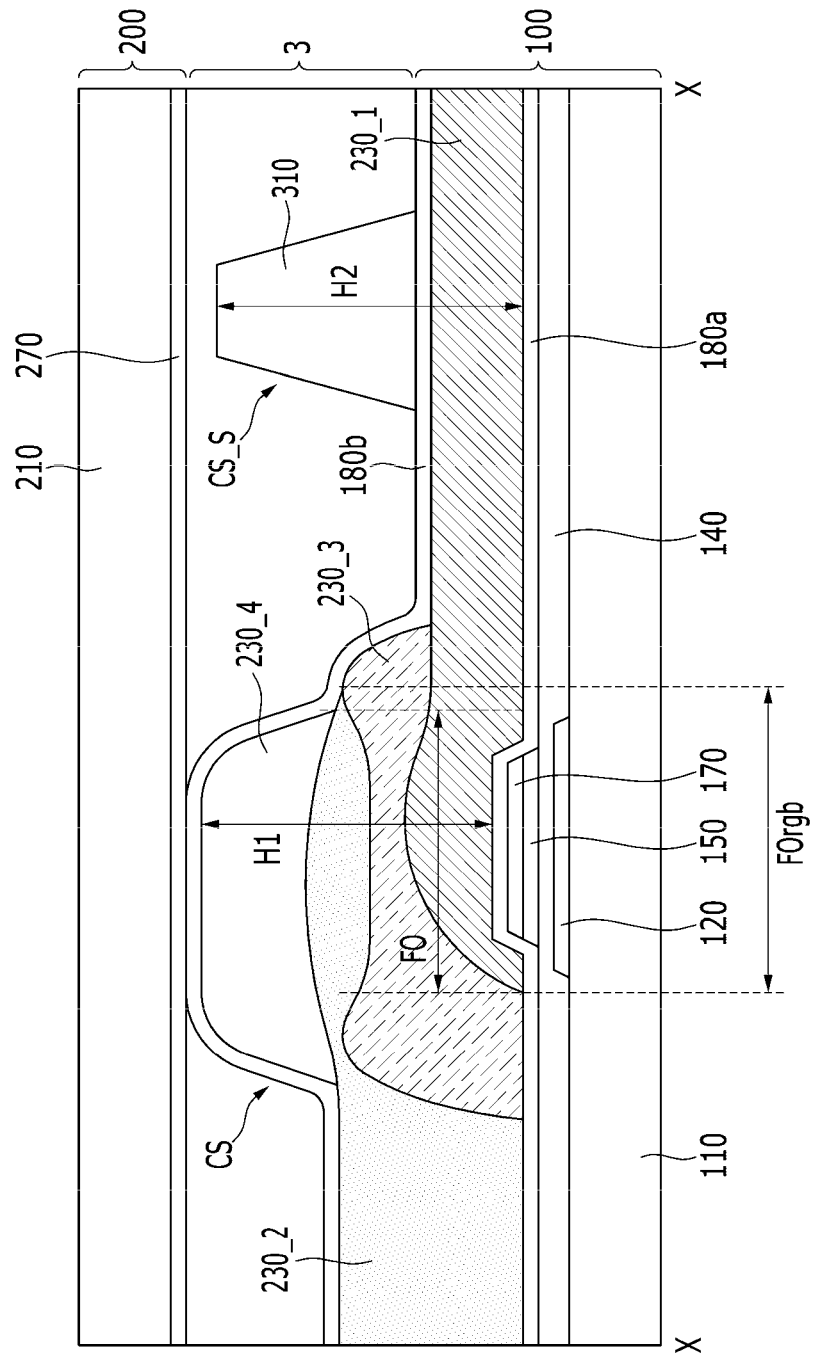
FIGS. 11, 12, and 13 are example cross-sectional views of the display panel taken along line X-X illustrated in FIG. 9 according to embodiments.
Figure 12:
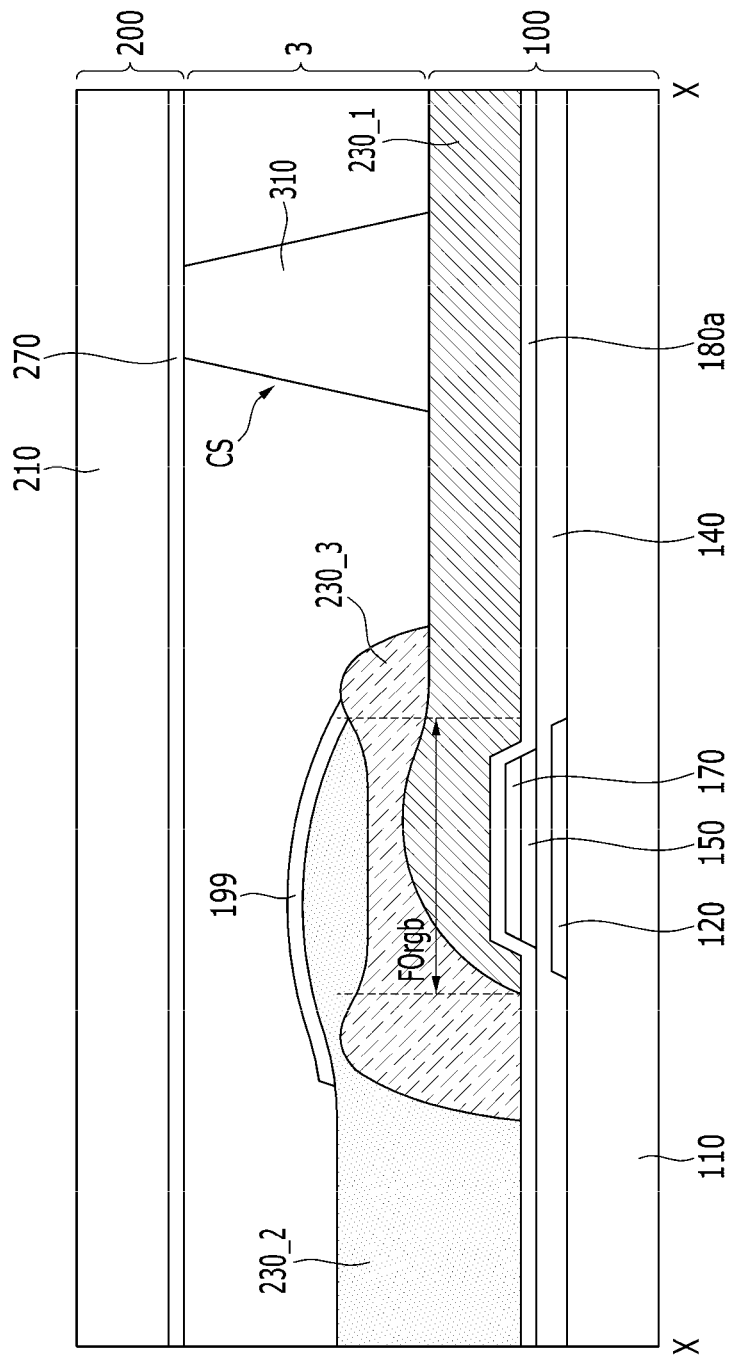
Figure 13:
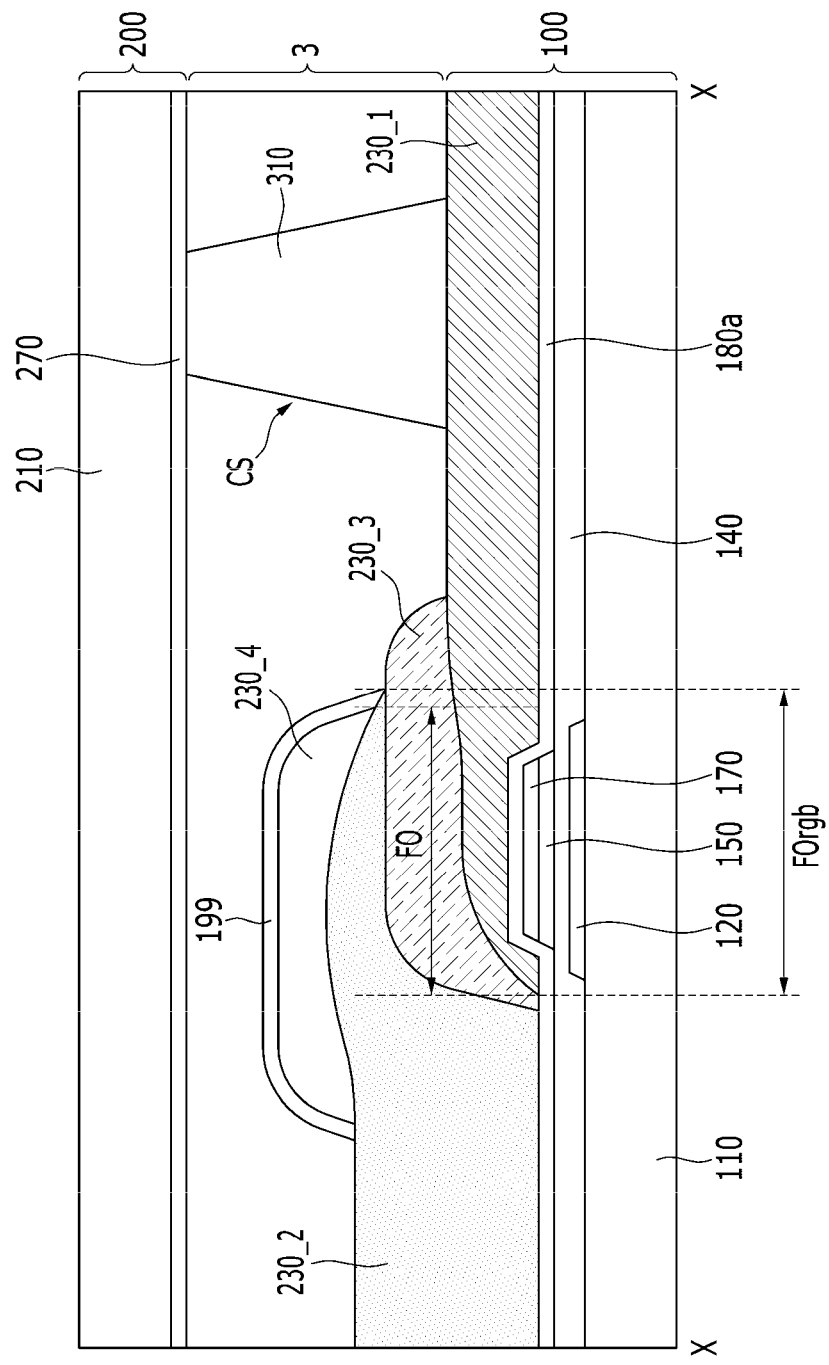

FIG. 9 is a layout view (or plan view) of the display panel according to an embodiment, FIG. 10 is a cross-sectional view of the display panel taken along line X-X illustrated in FIG. 9 according to an embodiment, and FIGS. 11, 12, and 13 are example cross-sectional views of the display panel taken along line X-X illustrated in FIG. 9 according to embodiments.

Referring to FIGS. 9 and 10, the display panel may have features analogous to or identical to aforementioned features described with reference to one or more of FIGS. 1 to 8, but a structure of the main spacer CS may be different. Referring to FIG. 9 and FIG. 10, the main spacer CS may not overlap the light blocking overlap portion FOrgb in a direction perpendicular to the substrate 110. The spacer CS may be positioned adjacent to the light overlap portion FOrgb.

Referring to FIG. 10, a spacer 310 may not overlap the light blocking overlap portion FOrgb and may serve as the main spacer CS. In this case, a part of one color filter 230_1, 230_2, or 230_3 or a white filter 230_4 positioned in a transmitting area may be positioned under the spacer 310. The spacer 310 may directly contact the common electrode 270 or the opposing panel 200, may be positioned between the common electrode 270 and the substrate 110, may be spaced from the transparent member 230_4 and/or the light-blocking structure FOrgb in a direction parallel to the substrate 110, and may be narrower than the transparent member 230_4 in the direction parallel to the substrate 110. The first-color part of the first-color filter 230_1 may be positioned between the spacer 310 and the substrate 110.

The spacing overlap portion FO including the white filter 230_4 is spaced apart from the spacer 310, and an upper surface thereof may be spaced from the opposing panel 200 without directly contacting the opposing panel 200. In this case, the spacing overlap portion FO may serve as a secondary spacer capable of maintaining an interval between the opposing panel 200 and the thin film transistor 100 when pressure is applied to the display panel.

Referring to FIGS. 9 and 11, the spacer 310 does not overlap the light blocking overlap portion FOrgb in the direction perpendicular to the substrate 110, may not directly contact the opposing panel 200, and may serve as a secondary spacer CS_S.

The spacing overlap portion FO including the white filter 230_4 is spaced apart from the spacer 310 in the direction parallel to the substrate 110, and an upper surface thereof may be in direct contact with the opposing panel 200. In this case, the spacing overlap portion FO may serve as a main spacer CS.

A thickness H1 of the spacing overlap portion FO, that is a thickness of a combination of the transparent member 230_4 and the light-blocking structure FOrgb in the direction perpendicular to the substrate 110, may be similar and unequal to a height H2 from an upper surface of the spacer 310 to a bottom surface of the part of the color filter 230_1, 230_2, or 230_3 positioned under the spacer 310. A difference between the thickness H1 and the height H2 may be in a range of about 0.3 micrometer to 0.5 micrometer, but is not limited thereto.

A distance between the opposing panel 200 and the secondary spacer (i.e., the transparent member 230_4, the passivation layer portion on the transparent member 230_4 illustrated in FIG. 10, or the spacer 310 illustrated in FIG. 11) may be in a range of about 0.3 micrometer to 0.5 micrometer.

A thickness of a combination of the spacer 310, a passivation layer 180b, and the first-color part may be greater or less than a thickness of a combination of the transparent member 230_4 and the light-blocking structure FOrgb by a margin that is in a range of 0.3 micrometer to 0.5 micrometer.

A liquid crystal layer portion of the liquid crystal layer 3 may be positioned between the common electrode 270 (or the opposing panel 200) and the transparent member 230_4 or the spacer 310 in the direction perpendicular to the substrate 110. A thickness of the liquid crystal layer portion in the direction perpendicular to the substrate 110 may be in a range of 0.3 micrometer to 0.5 micrometer.

Referring to FIGS. 9 and 12, no white filter 230_4 may overlap a light blocking overlap portion FOrgb in a direction perpendicular to the substrate 110. The light blocking overlap portion FOrgb may serve or may not serve as a secondary spacer, according to a height of the portion FOrgb.

A shielding electrode 199 may be positioned on the light blocking overlap portion FOrgb, may be positioned between the common electrode 270 and the second-color portion of the second-color filter 230_2, and may directly contact the second-color portion of the second-color filter 230_2. The shielding electrode 199 may include a part extended along the light blocking overlap portion FOrgb in a plan view of the display panel. The shielding electrode 199 may receive a predetermined voltage, such as a common voltage, and may prevent light leakage between the pixels PX.

The shielding electrode 199 may include a transparent conductive material and/or an opaque conductive material. For example, the shielding electrode 199 may include one or more metal layers, such as titanium (Ti) and/or copper (Cu), and/or a transparent conductive layer, such as an IZO. For example, the shielding electrode 199 may include a lower layer including titanium (Ti), an intermediate layer including an IZO, and an upper layer including copper (Cu).

The shielding electrode 199 or a transparent conductive layer of the shielding electrode 199 may be formed of the same material in the same process as that of the pixel electrode 191 and may be positioned in the same layer as that of the pixel electrode 191.

Referring to FIGS. 9 and 13, a shielding electrode 199 may be positioned on a spacing overlap portion FO, may be positioned between the transparent member 230_4 (or white filter 230_4) and the common electrode 270, and may directly contact the transparent member 230_4. The shielding electrode 199 may include a part extended along the light blocking overlap portion FOrgb in a plan view of the display panel. The shielding electrode 199 may receive a predetermined voltage, such as a common voltage, and may prevent light leakage between the pixels PX.

The shielding electrode 199 may include a transparent conductive material or an opaque conductive material. For example, the transparent shielding electrode 199 may be formed of the same material and in the same process as that of the pixel electrode 191 and may be positioned in the same layer as that of the pixel electrode 191. The opaque shielding electrode 199 may include a metal material, such as copper (Cu), and/or molybdenum (Mo).

Referring to FIGS. 9 to 13, the spacer 310 may directly contact both of the panels 100 and 200 and may directly contact at least one of the common electrode 270, the passivation layer 180b, and the first-color part of the first-color filter 230_1 in the transmitting area of the pixel PX_1.

A method of manufacturing the display panel according to an embodiment will be described with reference to the aforementioned drawings.

First, a conductive material for a gate conductor is stacked on a substrate 110, and a plurality of gate conductors 120 including a gate electrode 124 and a gate line 121 is formed by patterning the conductive material.

Next, an inorganic insulating material, such as a silicon nitride and a silicon oxide, is stacked on the gate conductors 120 to form a gate insulating layer 140.

Next, a semiconductor material and a conductive material for a data conductor are sequentially stacked on the gate insulating layer 140 and patterned to form a plurality of semiconductors 150 and a plurality of data conductors 170. In this case, an exposure process using a halftone optical mask including a semi-transparent area and the like may be used.

Next, an insulating material is stacked on the data conductor 170 to form a first passivation layer 180a, and a plurality of color filters 230_1, 230_2, and 230_3 and a white filter 230_4 are formed on the first passivation layer 180a. Particularly, a light blocking overlap portion FOrgb is formed between adjacent pixels PX by overlapping at least three color filters 230_1, 230_2, and 230_3. Further, according to an embodiment, a spacing overlap portion FO may also be formed by stacking the white filter 230_4 on the light blocking overlap portion FOrgb. When the light blocking overlap portion FOrgb is formed, a material for a photosensitive color filter may be stacked and then photolithography may be performed. In the photolithography, a thickness of the color filters 230_1, 230_2, and 230_3 of the light blocking overlap portion FOrgb may be different from a thickness of the color filters 230_1, 230_2, and 230_3 positioned in a transmission area of the pixel PX by using an optical mask including a halftone mask, such as a slit and a non-transparent area, in an area corresponding to the light blocking overlap portion FOrgb.

Next, an insulating material is stacked on the color filters 230_1, 230_2, and 230_3 and the white filter 230_4 to form a second passivation layer 180b. In this case, a contact hole 185 exposing the drain electrode 175 may be formed by patterning the first and second passivation layers 180a and 180b.

Next, a transparent conductive material, such as an ITO and an IZO, is stacked on the second passivation layer 180b and patterned to form a plurality of pixel electrodes 191. In this case, a shielding electrode 199 positioned on the light blocking overlap portion FOrgb or a spacing overlap portion FO may also be formed together.

Next, a spacer 310, which overlaps or is spaced apart from the light blocking overlap portion FOrgb, may be formed as necessary.

Accordingly, a thin film transistor panel 100 may be completed.

Next, a display panel may be completed by preparing an opposing panel 200 and bonding the opposing panel 200 and the thin film transistor panel 100.

Figure 14:
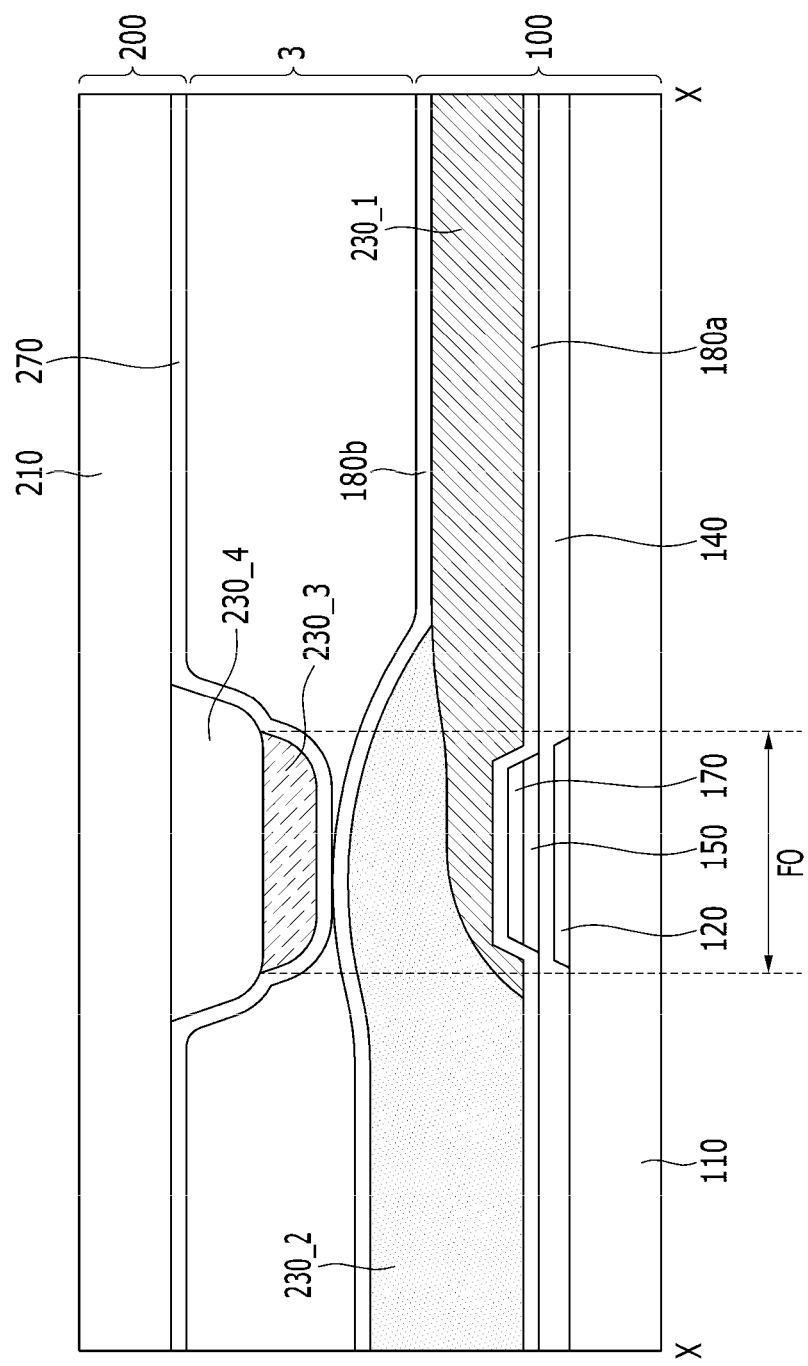
FIG. 14 is a cross-sectional view of a display panel according to an embodiment.

FIG. 14 is a cross-sectional view of a display panel according to an embodiment.

Referring to FIG. 14, some of the plurality of color filters 230_1, 230_2, and 230_3 and the white filters 230_4 may be positioned on the thin film transistor panel 100 and the other filters may be positioned on the opposing panel 200. FIG. 14 illustrates an example in which the first color filter 230_1 and the second color filter 230_2 are positioned on the thin film transistor panel 100, and the remaining third color filter 230_3 and white filter 230_4 are positioned on the opposing panel 200.

Accordingly, the spacing overlap portion FO may include the first and second color filters 230_1 and 230_2 positioned on the thin film transistor panel 100 and the third color filter 230_3 and the white filter 230_4 positioned on the opposing panel 200. Upper surfaces of the first and second color filters 230_1 and 230_2 positioned on the thin film transistor panel 100 may also be in contact with lower surfaces of the third color filter 230_3 and the white filter 230_4 positioned on the opposing panel 200 through the passivation layer 180b and the common electrode 270 as illustrated in FIG. 14, and may be spaced apart from lower surfaces of the third color filter 230_3 and the white filter 230_4 positioned on the opposing panel 200. The spacing overlap portion FO may serve as a spacer maintaining an interval between the thin film transistor panel 100 and the opposing panel 200.

A portion of the common electrode 270 may be positioned between the second-color portion of the second-color filter 230_2 and the third-color portion 230_3 in the direction perpendicular to the substrate 110. The third-color portion 230_3 may be positioned between the transparent member 230_4 and the portion of the common electrode 270 in the direction perpendicular to the substrate 110 and may directly contact each of the transparent member 230_4 and the portion of the common electrode 270.

A portion of the passivation layer 180b may be positioned between the second-color portion of the second-color filter 230_2 and the third-color portion 230_3 in the direction perpendicular to the substrate 110. The third-color portion 230_3 may be positioned between the transparent member 230_4 and the portion of the passivation layer 180b in the direction perpendicular to the substrate 110. The portion of the passivation layer 180b may directly contact each of the common electrode 270 and the second-color portion of the second-color filter 230_2.

Figure 15:
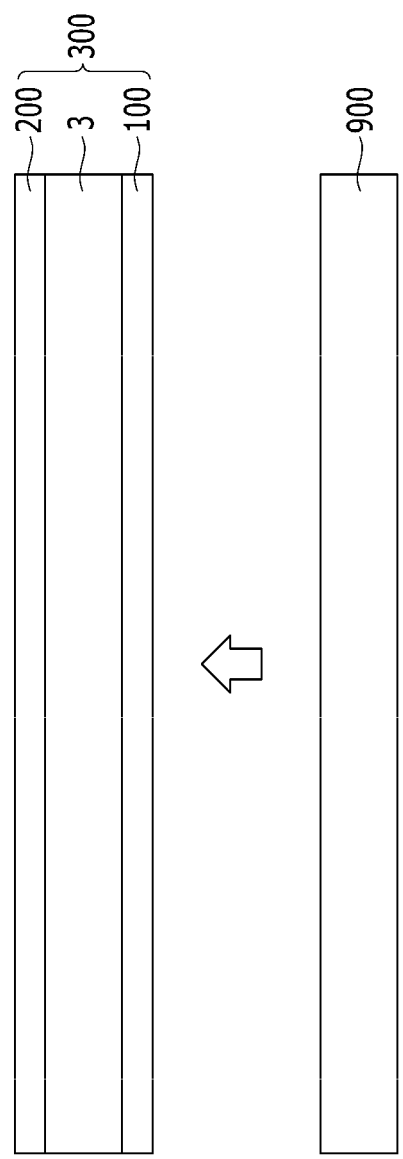
FIG. 15 is a schematic cross-sectional view of a display device including a display panel according to an embodiment.

FIG. 15 is a schematic cross-sectional view of a display device including a display panel 300 according to an embodiment.

Referring to FIG. 15, the display device may include a backlight unit 900 for supplying light to the display panel 300. The light supplied by the backlight unit 900 may be white light or a primary color light having a specific wavelength.

The display panel 300 may include the thin film transistor panel 100 and the opposing panel 200, which face each other, and the liquid crystal layer 3 positioned between the two panels 100 and 200. The display panel 300 may have one or more of features described above with reference to one or more of FIGS. 1 to 14.

While some embodiments have been described as examples, possible embodiments are not limited to the described embodiments. Embodiments are intended to cover various modifications and equivalent arrangements within the spirit and scope of the appended claims.

What is claimed is:
1. A display panel comprising:
a substrate;
a first-color filter, which overlaps the substrate and comprises a first-color portion and a first-color part;
a second-color filter, which comprises a second-color portion and a second-color part;
a third-color portion; and
a light-blocking structure comprising the first-color portion, the second-color portion, and the third-color portion that are stacked in a direction perpendicular to the substrate in a stack structure,
wherein the first-color part is positioned in a color pixel of the display panel, wherein the color pixel of the display panel has two edges respectively extending straightly in different directions and connected to each other in a plan view, and
wherein the stack structure includes two stack structure portions in the plan view, wherein the two stack structure portions respectively continuously extend along the two edges of the color pixel of the display panel in the plan view.

2. The display panel of claim 1, wherein the light-blocking structure displays a black color through subtractive mixing of colors of the first-color portion, the second-color portion, and the third-color portion.

3. The display panel of claim 1, wherein a maximum thickness of the first-color portion is less than a maximum thickness of the first-color part.

4. The display panel of claim 1 comprising:
a third-color filter, wherein the third-color portion is positioned between the first-color portion and the second-color portion and is separated from the third-color filter, and wherein the third-color portion and the third-color filter are formed of a same third-color material.

5. The display panel of claim 1 comprising:
a transparent member formed of a colorless or white insulating material, wherein the second-color portion is positioned between the first-color portion and the transparent member in the direction perpendicular to the substrate.

6. The display panel of claim 5 comprising:
an electrode; and
a passivation layer positioned between the electrode and the transparent member and directly contacting each of the electrode and the transparent member.

7. The display panel of claim 5 comprising:
a spacer, wherein the transparent member is positioned between the second-color portion and the spacer in the direction perpendicular to the substrate and is wider than the spacer in a direction parallel to the substrate.

8. The display panel of claim 5 comprising:
an electrode; and
a spacer directly contacting the electrode, positioned between the electrode and the substrate, spaced from the transparent member in a direction parallel to the substrate, and being narrower than the transparent member in the direction parallel to the substrate.

9. The display panel of claim 8, wherein the first-color part is positioned between the spacer and the substrate.

10. The display panel of claim 8, wherein a thickness of a combination of the spacer, a passivation layer, and the first-color part is greater or less than a thickness of a combination of the transparent member and the light-blocking structure by a margin that is in a range of 0.3 micrometer to 0.5 micrometer.

11. The display panel of claim 8, wherein a liquid crystal layer portion is positioned between the electrode and one of the transparent member and the spacer in the direction perpendicular to the substrate.

12. The display panel of claim 5 comprising:
a common electrode overlapping the substrate; and
a shielding electrode positioned between the common electrode and the transparent member.

13. The display panel of claim 12 comprising:
a pixel electrode overlapping the first-color part, wherein the pixel electrode and the shielding electrode are formed of a same material.

14. The display panel of claim 1 comprising:
a common electrode overlapping the substrate;
a shielding electrode positioned between the common electrode and the second-color portion; and
a pixel electrode overlapping the first-color part, wherein the pixel electrode and the shielding electrode are formed of a same material.

15. The display panel of claim 14 comprising:
a spacer positioned between the common electrode and the first-color part and directly contacting at least one of the common electrode and the first-color part.

16. The display panel of claim 1 comprising:
a signal line overlapping the substrate; and
a transistor electrically connected to the signal line, wherein at least one of the signal line and the transistor overlaps each of the first-color portion, the second-color portion, and the third-color portion in the direction perpendicular to the substrate.

17. The display panel of claim 1 comprising:
a common electrode, wherein a portion of the common electrode is positioned between the second-color portion and the third-color portion in the direction perpendicular to the substrate.

18. The display panel of claim 17 comprising:
a transparent member formed of a colorless or white insulating material, wherein the third-color portion is positioned between the transparent member and the portion of the common electrode in the direction perpendicular to the substrate.

19. The display panel of claim 1 comprising:
a passivation layer, wherein a portion of the passivation layer is positioned between the second-color portion and the third-color portion in the direction perpendicular to the substrate.

20. The display panel of claim 19, further comprising:
a transparent member formed of a colorless or white insulating material, wherein the third-color portion is positioned between the transparent member and the portion of the passivation layer in the direction perpendicular to the substrate.

21. The display panel of claim 1, wherein:
the second-color part is positioned closer to the substrate than the second-color portion, and
the third-color portion is positioned between the second-color portion and the substrate, and directly contacts each of the first-color portion, the second-color portion, and the second-color part.

22. A display panel comprising:
a substrate including a display area, the display area comprising a plurality of pixels, each of the pixels including a transmitting area;
a first-color filter disposed on the substrate, the first-color filter comprising a first pixel portion disposed in the transmitting area of a first pixel, and a first overlap portion connected to the first pixel portion;
a second-color filter disposed on the substrate, the second-color filter comprising a second pixel portion disposed in the transmitting area of a second pixel, and a second overlap portion connected to the second pixel portion; and
a third-color filter disposed on the substrate, the third-color filter comprising a third pixel portion disposed in the transmitting area of a third pixel,
wherein
the first overlap portion and the second overlap portion are stacked in a direction perpendicular to a surface of the display area to form a stack structure extending in a direction between the transmitting areas of adjacent pixels of the plurality of pixels in a plan view,
the stack structure continuously extends in the first direction along edges of two or more pixels that represent different colors and are arranged in a row in the first direction in the plan view, and
the display panel further comprises transistors disposed on the substrate.

23. The display panel of claim 22, wherein a maximum thickness of the first overlap portion is less than a maximum thickness of the first pixel portion.

24. The display panel of claim 23, further comprising a spacer disposed on the light-blocking structure.

25. The display panel of claim 24, wherein the spacer has a color.

26. The display panel of claim 25, further comprising an insulating layer disposed between the light-blocking structure and the spacer.

27. The display panel of claim 26, wherein the insulating layer includes an organic material.

* * * * *